Patented Jan. 16, 1951

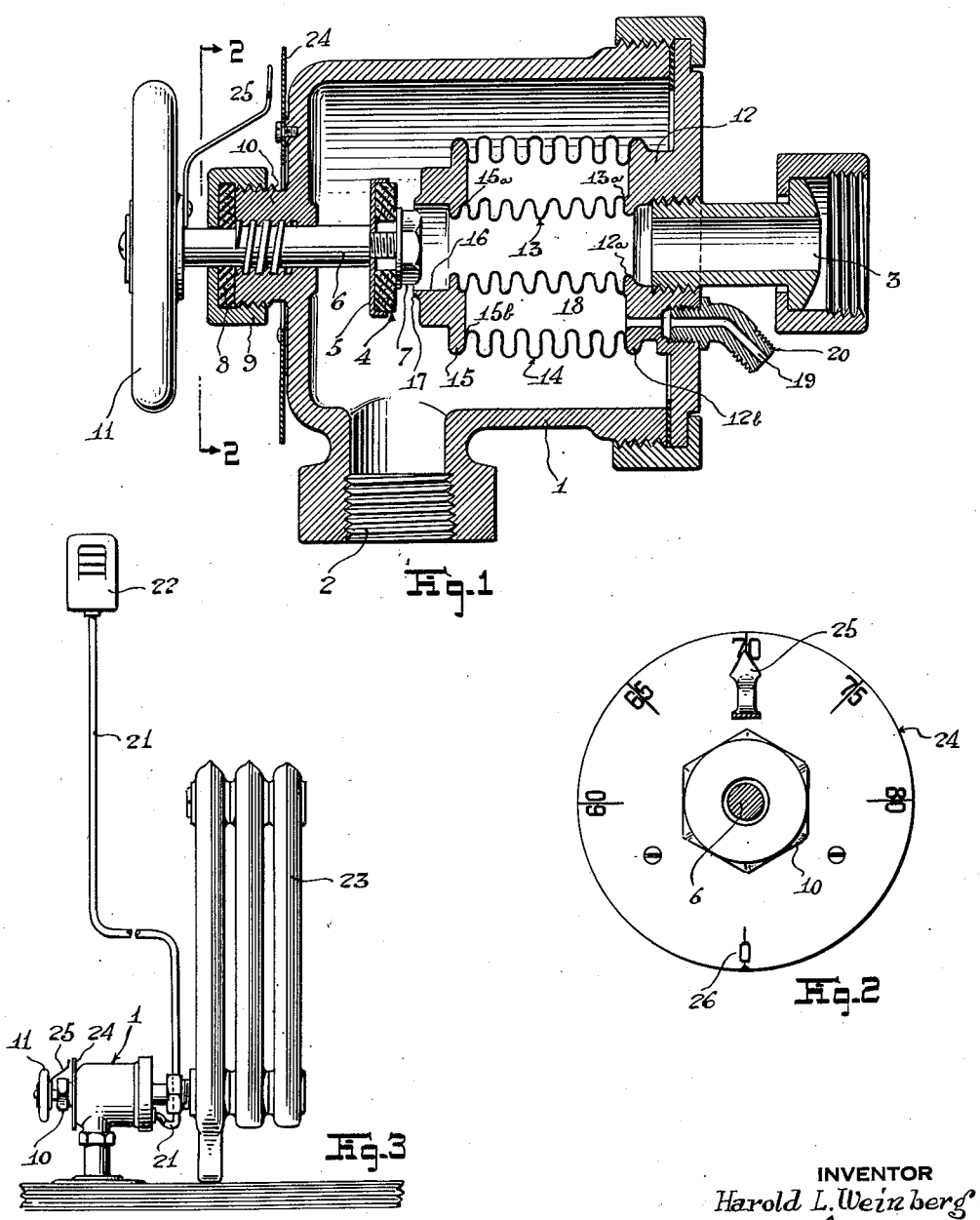

2,538,436

UNITED STATES PATENT OFFICE 2,538,436

CONTROL VALVE

Harold L. Weinberg, West Orange, N. J., assignor to Thomas A. Edison, Incorporated, West Orange, N. J., a corporation of New Jersey Application April 29, 1947, Serial No. 744,657

4 Claims. (Cl. 236—99)

This invention relates to control valves of the throttling type, and more particularly to an improved form of such valve which is arranged so as to be uninfluenced by the pressure at one side of the valve. As a typical application thereof, the present valve is thermostatically controlled to regulate the flow of steam to a radiator according to the room temperature. However, this application is intended to be illustrative and no unnecessary limitation of my invention thereto is intended.

Typically, the movable valve member of throttling valves is influenced by the pressure both at its inlet and outlet sides with the result that the differential pressure on the valve tends to be different when the valve is closed than when it is open. The effect of this varying differential pressure is to prevent the movable valve member from operating with a truly throttling action since this resultant pressure on the valve, as a typical case, tends to delay the opening of the valve and to cause it, when the valve does open, to move with a snap action. To get true pressure balance on a movable valve member there is commonly used the double or spool-type valve. This valve is however not very practical because of the difficulty of getting the two valves to seat at the same time.

The above-mentioned difficulties in obtaining true throttling action are overcome in the present invention by providing a valve construction which is so arranged that the movable valve member is responsive to the pressure at only one side of the valve, typically the inlet pressure. With this arrangement, the effective pressure on the movable valve member does not vary as the valve is opened and closed and true throttling therefore is obtained.

A further feature of my invention is that I provide a thermostatically-controlled temperature-regulating system comprising a throttling valve which is settable independently of the thermostat of the system to maintain a selected temperature. Also, by this same control I am enabled to totally shut off the valve when the same is not in use.

A further feature of my invention is to provide a truly throttling valve for steam regulation which has free drainage to its inlet port so as not to collect liquid when the valve is not in use.

These and other objects and features of my invention will be apparent from the following description and the appended claims.

In the description of my invention reference is had to the accompanying drawings, of which:

Figure 1 is an axially sectional view of a thermostatically-controlled throttling valve according to my invention;

Figure 2 is a detailed view taken on the line 2—2 of Figure 1; and

Figure 3 is a view illustrating the present valve for regulating the steam flow to a radiator.

The present valve comprises a substantially cylindrical housing 1 having an inlet port 2 at the side and an axial outlet port 3 at one end. At the other end of the housing, axially in line with the outlet port, is a normally-stationary valve member 4 comprising a fibre disk backed by a washer 5 and having a central opening receiving a threaded reduced-diameter end portion of a shaft 6, the valve being secured to this shaft by a nut 7. The shaft is screw-threaded in the end wall of the housing and has a fluid-tight seal thereto provided by a packing ring 8 and an associated packing nut 9 which is threaded onto an extending exteriorly-threaded boss 10 of the housing. On the outer end of the shaft 6 there is a knob 11 adapted to be gripped by the hand to adjust the valve member 4 as is hereinafter described. Within the housing around the outlet port 3 there is a flange 12 having rims 12a and 12b at the inner end thereof which respectively extend radially inwardly and outwardly relative to the central axis of the housing. Sealed to the inner rim 12a at 13a, is one end of a bellows 13. This bellows provides an extension inwardly of the housing of the outlet port 3. Sealed likewise to the outer rim 12b is a second bellows 14 which is concentric with the inner bellows. The inner or free ends of these bellows are sealed respectively to rims 15a and 15b of an annular valve member 15. This valve member forms a movable end wall for the two bellows, and a central opening 16 in the valve member forms a further extension of the outlet port 3. This annular valve member 15 and the relatively stationary valve member 4 are adapted to engage one another on a circle having a diameter equal substantially to the diameter of the junction 13a at which the fixed end of the bellows 13 is joined to the housing. For example, for this purpose the valve member is provided with an annular lip 17 having a diameter equal to that of the junction 13a, which is adapted to engage with or seat on the relatively stationary valve member 4.

Since the two bellows are sealed to the flange 12 at one end and to the valve 15 at the other end, there is formed therein an annular chamber 18 which is sealed from the surrounding space within the housing. This chamber is filled with a gas or other fluid. In the present preferred embodiment this chamber is provided with an opening 19 leading by way of a nipple 20 and tube 21 to a thermostatic bulb 22. This thermostatic bulb and tube 21 are filled with a highly volatile liquid such as alcohol. In the illustration shown in Figure 3 the valve is employed to regulate the flow of steam to a radiator 23 placed for example in the same room as is the thermostatic bulb 22. As the temperature varies in the room the bulb varies the amount of thermostatic fluid within the bellows chamber 18, whereat under the heating influence of the steam this fluid is maintained in a gaseous state. As is well understood in the art, the volume expansion which the thermostatic fluid undergoes as it is volatilized by the heating medium controlled by the valve causes the bulb to control the valve with a high degree of sensitivity.

By way of illustration, it will be seen that the operation of the valve is as follows: When the temperature in the room rises the bulb discharges more of the thermostatic fluid into the bellows chamber 18 causing the annular valve member to be moved towards the stationary valve member 4 to reduce the flow of steam to the radiator. If the room is too cool, the bulb takes back some of the thermostatic fluid (the fluid condensing within the tube 21) to cause the pressure in the bellows chamber to decrease. In response to this decrease in pressure within the bellows chamber, the annular valve member is moved away from the stationary valve member by the combined action of the pressure of the steam against the annular valve member and the spring action of the bellows themselves. As the valve members move apart more steam is again allowed to pass through the inner bellows and outlet port to the radiator. Thus the valve is continuously throttled so as to maintain substantially a given temperature within the room.

It will be observed that in the present device the valve operation is wholly independent of the pressure at the outlet port 3. This result follows because the outlet duct is through the annular valve member 15, and the valve members 4 and 15 are arranged to seat on a circle having a diameter equal to that at which the inner bellows 13 is joined at its fixed end to the housing or, from a broader viewpoint, the valve members seat on a line which encloses an area equal substantially to the cross sectional area of the inner bellows at its fixed end. As so arranged, all movable surfaces of the valve member 15 and the inner bellows 13, which are exposed to the outlet pressure, are balanced with respect to that pressure. Since the outlet pressure has no influence then on the action of the valve, the valve is controlled solely by the inlet pressure, the pressure within the bellows chamber 18 and the spring constants of the bellows themselves. The resultant pressure on the movable valve member 15 therefore does not vary in response to opening and closing of the valve and, as a result, a smooth throttling action of the valve is obtained.

The present valve may be manually set to throttle at and maintain different selected room temperatures without requiring that any adjustment be made of the thermostatic system of the valve—that is, of the bulb 22, tube 21 or bellows chamber 18. This manual setting is done by the control knob 11. As this knob is turned clockwise the valve member 4 is moved away from the valve member 15 (because of a reverse thread which the shaft 6 has in the housing). Higher temperatures of the bulb 22 are therefore required to cause the bellows 13 and 14 to expand sufficiently to close the valve. Vice versa, counterclockwise turning of the knob 11 will cause the valve to close at lower temperatures. Preferably, a dial 24 is mounted on the housing and a pointer 25 is mounted on the shaft 6 for registration with the dial as shown in Figures 1 and 2. The dial is calibrated in degrees of temperature so that the pointer will indicate the temperature at which the valve is set.

A further feature of the present valve is that the control for setting the valve serves also as the control for shutting off the valve. For instance, to shut off the valve, the control knob 11 is turned counterclockwise beyond the temperature scale until the pointer 25 registers with a zero position as at 26 (Figure 2).

Although my invention is not limited to angle-type housings—that is, a housing having inlet and outlet ports at right angles to each other, as shown—I preferably use such housing and in such position that the inlet port is directed downwardly so that any condensate of steam, or other liquid which the valve may control, will drain from the housing when the valve is not in use. Thus, corrosion of internal parts and tendencies for sticking of the valve members are greatly lessened.

I have herein particularly described my invention in terms of a preferred embodiment, but it will be understood that this embodiment is illustrative and not necessarily limitative of my invention since the same is subject to changes and modifications without departing from the scope of my invention, which I endeavor to express by the following claims.

I claim:

1. In a valve including a housing having inlet and outlet ports: the combination of a first valve member mounted on said housing, a movable annular valve member adapted to seat on said first member in sealed relation thereto, a pair of concentric expansible bellows spaced from one another, said pair of bellows at one end thereof being sealed to each other and fixedly mounted in relation to said housing with the inner one of said bellows forming an extension of one of said ports, the other ends of said bellows being sealed to said annular valve member so that said one port leads through the annular valve member, and said valve members being so arranged that the area enclosed by the seating line therebetween is equal substantially to the cross sectional area of the inner one of said bellows at its fixed end.

2. In a valve including a housing having inlet and outlet ports: the combination of a first normally-stationary valve member and a cooperating movable annular valve member having a central opening which is closed when said valve members are engaged, a pair of concentric expansible bellows spaced from one another, said pair being at one end mounted on and sealed to said housing around one of said ports and being at the other end sealed to said annular valve member around said central opening thereof, said valve members providing communication through the inner one of said bellows between said ports when the valve members are open and said valve members being arranged so that the area enclosed by the seating line between the valve members is equal substantially to the cross sectional area of the inner one of said bellows at its junction line with said housing, a thermostatic system for varying the pressure within the annular chamber formed between said bellows in response to variations in temperature at a given place, and an adjustable mounting for said first valve member manually operable to set said valve to close at a preselected value of said temperature and also manually operable to shut off said valve when the same is not to be used.

3. In a valve including a housing having inlet and outlet ports: the combination of a pair of spaced concentric bellows sealed to said housing around one of said ports so that the inner one of said bellows provides an extension of said one port, a movable annular valve member sealed to the free ends of both of said bellows whereby said bellows provide a closed annular chamber within said housing and said one port leads through said annular valve member, and a normally-stationary valve member in said housing adapted to engage said annular valve member on a circular line having a diameter equal substantially to the diameter of the inner one of said bellows at the place where it is joined to said housing.

4. In a valve including a housing having inlet and outlet ports: the combination of a movable annular valve member, a pair of expansible concentric bellows having adjacent fixed ends mounted on said housing and having movable free ends secured to said annular valve member whereby communication between said ports is through the inner one of said bellows and the annular valve member, said bellows being sealed at the ends to form a closed chamber therebetween, said chamber containing a fluid for varying the pressure therewithin, and a relatively stationary valve member against which said annular valve member is adapted to seat in response to an expansion of said bellows, said valve members being adapted to close on a seating line which encloses an area equal substantially to the effective cross-sectional area of the inner one of said bellows at its said fixed end on said housing.

HAROLD L. WEINBERG.

REFERENCES CITED

The following references are of record in the file of this patent:

UNITED STATES PATENTS

| Number | Name | Date |
|---|---|---|
| 1,621,774 | Fitzgerald | Mar. 22, 1927 |
| 1,841,211 | Ryden et al. | Jan. 12, 1932 |
| 1,930,227 | Donahue | Oct. 10, 1933 |
| 2,463,598 | Carson | Mar. 8, 1949 |

FOREIGN PATENTS

| Number | Country | Date |
|---|---|---|
| 537,629 | France | 1922 |